March 17, 1959 R. BRADT 2,877,501
GLASS-REINFORCED THERMOPLASTIC INJECTION MOLDING
COMPOUND AND INJECTION-MOLDING
PROCESS EMPLOYING IT
Filed Dec. 24, 1952

INVENTOR.
REXFORD BRADT,
BY
ATTORNEYS.

United States Patent Office 2,877,501
Patented Mar. 17, 1959

2,877,501

GLASS-REINFORCED THERMOPLASTIC INJECTION MOLDING COMPOUND AND INJECTION-MOLDING PROCESS EMPLOYING IT

Rexford Bradt, Warsaw, Ind., assignor to Fiberfil Corporation, Warsaw, Ind., a corporation of Indiana Application December 24, 1952, Serial No. 327,935

17 Claims. (Cl. 18—55)

This invention relates to a glass filled plastic compound suitable for use in injection molding machines and to a method of manufacturing the compounds.

Fiber glass, glass mat, and similar ceramic-like materials have previously been used to fill plastics which were set into their final hardened form in pressure molds, but heretofore a glass filled plastic compound suitable for injection molding has not been considered to be a practical possibility. It has been found, however, that fiber glass filaments, glass threads, or roving, when properly pre-treated and compounded with a suitable molding plastic, provide an injection molding compound wherein the glass filler will remain dispersed, and will not filter out, when the compound is molded in an injection molding machine. On the contrary, the injection molding composition provided by the present invention produces, when injection molded, articles which have high dimensional stability, high modulus elasticity, high resistance to distortion by heat, high tensile strength, unusually high impact strength and low shrinkage during curing.

This invention provides an injection molding granule which consists of sized lengths of glass roving or glass thread which is uniformly coated with a molding plastic. It has been found that glass fibers consisting of about 240 filaments to a strand, and having a weight of about 15,000 yards per pound, are suitable in practicing the present invention. Roving or strands of this nature may be opened up for the necessary sizing and for the subsequent impregnation with molding plastic so that a uniform injection molding compound is obtained which is not subject to filtering out of the glass filler in the course of the injection molding operation. Diced glass mat and similar materials which do not provide a selected fiber length and which can not be opened up for impregnation by sizing and molding compounds are not satisfactory, and when used produce a molded article of inferior character. It has been found that for general use, a fiber length of from about ¼–1 inch, depending upon the resistance to impact which is desired, may be employed. It is not necessary, or desirable, to employ a fiber length of 1½–2 inches, as was formerly thought necessary in connection with casting resins, in order to obtain maximum strength in the molded product.

Figure 1:
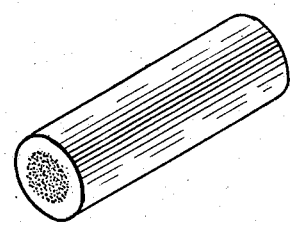
Figure 2:
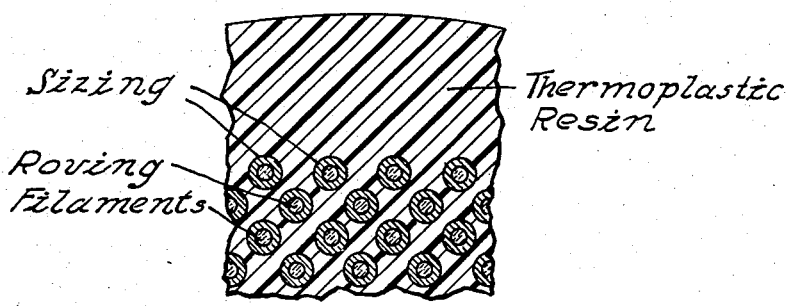

In the accompanying drawing:

Fig. 1 is a somewhat idealized isometric view, on an enlarged scale, of a molding granule embodying my invention; and Fig. 2 is a somewhat idealized, fragmental cross-section of a molding granule on a still further enlarged scale.

Each filament in the threads or roving contained in the injection molding granule is uniformly sized with a polymerizable composition, such as polyvinyl acetate, which is compatible with the superjacent plastic molding composition employed. Preferably, the glass roving or threads which have been sized are opened up before the molding composition is applied thereto so that each filament in the granule may be uniformly coated. It has been found that molding granules of this kind when used in an injection molding machine will provide a product in which the glass filler is uniformly dispersed and oriented so that the articles formed therefrom exhibit the superior properties previously mentioned. The extent to which the more important characteristics of an injection molded article are improved by the use of the glass filled injection molding composition of the present invention in place of a standard injection molding compound comprising the same plastic composition is evident from the following table.

| Characteristics | Standard No. 1 Commercial Grade Polystyrene Injection Molding Compound | ½ Inch Glass Roving Sized With Polyvinyl acetate and Impregnated with Polystyrene |
|---|---|---|
| Percent of Glass Filler by Weight | 0.0 | 32.8 |
| Tensile Strength, p. s. i. | 6,670 | 11,090 |
| Percent Elongation | 1.76 | 1.01 |
| "IZOD" Impact Notched ft.-lbs. per inch of notch | .315 | 1.41 |
| Heat of distortion, °F. | 176 | 218 |
| Specific Gravity | 1.06 | 1.31 |

It will be apparent from the listed characteristics that the invention provides a material which is non-yielding and rigid even at the temperatures of boiling water. A gain of 40° F.–50° F. above the softening point of non-fibered polystyrene is commonplace.

The non-yielding fiber glass filler likewise sustains an applied load and prevents localized overloading, cracking, or straining and resultant crazing observed in vitreous unfilled styrene. This characteristic makes the material useful in the field of nuts, bolts, inserts, vibration proof connectors, etc., as well as pressure vessels and parts.

Similarly thermal shock is minimized and virtually eliminated, with the substance retaining its outstanding properties at temperatures of 62° F. below zero.

Machining, punching, drilling and general workability of objects made of this compound are far superior to unfibered polystyrene.

It will be understood that the twisted strands, or threads referred to above, are employed instead of roving where especially high impact strength and tensile strength is desired in the final product. The granules may be of cylindrical or rectangular cross-section and for general use a diameter of about ⅛ inch–1/16 inch is most suitable.

It is preferred to manufacture the injection molding composition of the kind described above by a continuous process. This process may consist of passing roving strands continuously into a sizing bath of polyvinyl acetate or polyester, for example, and thereafter passing the sized strand into a bath comprising an emulsion of polystyrene or other molding plastic compositions, or mixtures thereof, which it is desired to utilize. While the roving is submerged therein, the filaments may be opened up and spread out to facilitate impregnation. The sized and impregnated strand may then be passed continuously into a drying zone maintained at about 250–300° F. and thereafter into a fluxing zone maintained at between about 350–450° F. The temperatures and times of heat treatment will vary in the known ways according to the composition of the molding plastic bath. Both heating operations should be conducted in an inert atmosphere to prevent deterioration of the plastic material. After fluxing, the hardened strands may be cut into granules generally varying between ¼–½ inch, according to the requirements of the particular application. It will be observed that this process results in the necessary orientation of the glass filler along one axis of the granule. The desired molding plastic content may be obtained also by first passing the sized roving or thread through a plastic bath of one composition and thereafter, with or without intermediate treatment, passing it successively through baths of other molding plastic compositions.

It has been found that the content of the glass in the injection molding composition should be maintained between about 15–60% by weight, in order to obtain the properties desired in the molded article, and at the same time permit the compound to be handled in the conventional injection molding machines.

It will be understood, that the injection molding composition provided by the invention may be blended with other molding compounds in the conventional manner. The foregoing limiting percentages of glass filler refer to the weight of glass filler which is contained in the composition finally fed to the injection molding machine. The percentage weight of glass filler in the composition fed to the injection molding machine may also be varied by blending the glass filled compound with standard molding compositions according to the well-understood techniques of the art.

The proportion of molding compound with which the sized roving is invested may be controlled in the plastic bath by controlling the viscosity of the bath. This may be accomplished by any of the well-known techniques such as controlling the pH of the bath, adding polymerized solids or by adding thickening agents such as carboxy-methyl cellulose, aluminum sulfate, gums, etc. Other plasticizers, mold lubricants, coloring agents, etc. may also be added to the plastic bath according to well-known practice.

A preferred method comprises passing the sized roving or thread into a bath of partially polymerized styrene which also contains a suitable polymerization catalyst such as, for example, benzolyl peroxide. The refractive index of the bath may be adjusted to that of the glass fiber so that the final molded articles are transparent. The roving, or thread, thus invested with the substantially monomeric styrene is passed through the heating stages, previously described, during which time the styrene polymerizes completely into its final hardened form. Thereafter, the roving or threads are chopped to size to provide the injection molding granules previously described. It will also be understood that the roving or threads leaving the molding plastic bath may be compacted prior to passing them into the heating zones.

The following examples are specific illustrations of the manner in which the invention may be practiced.

*Example 1*

30 parts of 60 end, #150 fiber glass roving was first lightly sized with an aqueous emulsion of polyvinyl acetate. The sized roving was then impregnated with 70 parts polystyrene and secondary amounts of mold lubricant, coloring, and plasticizer. The sized and impregnated roving was passed through a heating zone maintained at about 300° F. and thereafter through a fluxing zone maintained at about 400° F. An inert atmosphere was maintained in both heating zones. Thereafter, the hardened strand was cut into ½ inch lengths to provide an injection molding compound in which the continuous glass filler fibers were aligned generally parallel to one axis of the granules thus formed. The articles formed from this molding composition exhibited properties similar to those indicated for the glass filled injection molding compound listed in Table I.

*Example 2*

An injection molding compound was formed as described in Example 1 except that the roving was sized with a polyester composition instead of with polyvinyl acetate. The polyester was of the general type formed by dispersing in an unsaturated solvent, such as styrene, the reaction product of glycols with di-basic acids, for example, maleic, phthalic, etc. The articles formed from this injection molding compound also exhibited properties similar to those listed in Table I.

*Example 3*

A further injection molding compound was prepared as described in Example 1 except that the roving was first sized with a mixture of polyvinyl acetate and stearate chromate. The characteristics of articles formed from this compound were also similar to those listed in Table I.

*Example 4*

30 parts of 60 end, #150 fiber glass roving was sized with a 5% solution of polyester, as described in Example 2, and thereafter impregnated with 70 parts of an equal mixture of molding quality polystyrene and acrylonitrile rubber. The sized and impregnated roving was heated and fluxed in an inert atmosphere and thereafter cut into lengths of ¼ inch to ½ inch to provide injection molding granules. Secondary amount of plasticizers and coloring agents were present in the plastic mixture of polystyrene and acrylonitrile rubber. The articles which were injection molded from this compound had characteristics similar to those listed in Table I except that the impact strength was much higher.

*Example 5*

Injection molding compound was prepared according to Example 1 except that a styrene-butadiene was employed in place of the polystyrene in Example 1. The articles molded from this compound had outstanding impact resistance and were unusually inert to chemical change.

*Example 6*

A suitable compound for transfer molding was prepared by impregnating 30 parts of #150 glass fiber as roving and threads with a composition consisting of equal parts of molding glass polystyrene and catalyzed polyester molding resin. Secondary amounts of coloring agent, mold lubricant and plasticizers were present in the molding plastic mixture.

Having thus described the invention what is claimed as new is:

1. An injection molding compound comprising elongated granules of approximately one-sixteenth to one-eighth inch in diameter and having therein from about 15–60% by weight of the granule of generally parallel glass filaments extending longitudinally of the granule, said filaments being coated with a polymerized sizing compound and a superjacent thermoplastic molding composition.

2. An injection molding compound as described in claim 1 wherein said sizing is polyvinyl acetate and said superjacent molding composition is polystyrene.

3. An injection molding compound as claimed in claim 1 wherein said sizing is a polyester and said superjacent molding composition is polystyrene.

4. An injection molding compound as claimed in claim 1 wherein said sizing is polyvinyl acetate and said superjacent molding plastic is a styrene-butadiene copolymer.

5. An injection molding compound as claimed in claim 1 wherein said glass filaments consist of 60 end, #150 fiber glass roving, said sizing is polyvinyl acetate and said superjacent molding composition is polystyrene.

6. A method of manufacturing an injection molding compound comprising the steps of continuously passing glass filaments through a sizing bath and thereafter through at least one bath of a thermoplastic molding composition emulsified in water to impregnate the sized filaments, passing the sized and impregnated filaments into a heating zone first to evaporate the water of the emulsion and then to flux the thermoplastic residue, maintaining an inert atmosphere in said zone, withdrawing the treated filaments from said zone and chopping them into granules.

7. A method of manufacturing an injection molding compound comprising the steps of passing glass filaments through a bath of polyvinyl acetate emulsion and thereafter through a bath of substantially monomeric catalyzed styrene to impregnate the sized filaments, heating the impregnated filaments in an inert atmosphere to aid polymerization of the styrene and thereafter chopping the thus treated filaments into granules.

8. An elongated injection molding granule of approximately one-sixteenth to one-eighth inch in diameter and comprising 15–60% by weight of glass filaments extending longitudinally of the granule, said filaments being coated with a thermosetting plastic composition and a superjacent thermoplastic molding plastic.

9. An injection molding compound comprising elongated granules of approximately one-sixteenth to one-eighth inch in diameter and having therein from about 15–60% by weight of the granule of glass filaments extending generally parallel to each other longitudinally of the granule, said filaments being coated with a thermoplastic molding composition.

10. An injection molding compound comprising elongated granules of approximately one-sixteenth to one-eighth inch in diameter and having therein from about 15–60% by weight of the granule of glass filaments extending generally parallel to each other longitudinally of the granule, said filaments being coated with polystyrene.

11. An injection molding compound comprising elongated granules of approximately one-sixteenth to one-eighth inch in diameter and having therein from about 15–60% by weight of the granule of glass filaments extending generally parallel to each other longitudinally of the granule, said filaments being coated with styrene-butadiene copolymer.

12. In the process of injection molding, the step of forcing into a mold an injection molding compound comprising elongated granules having therein from about 15–60% by weight of the granule of glass filaments extending generally parallel to each other longitudinally of the granule, said filaments being coated with a thermoplastic molding composition.

13. In the process of injection molding, the step of forcing into a mold an injection molding compound comprising elongated granules having therein from about 15–60% by weight of the granule of glass filament extending generally parallel to each other longitudinally of the granule, said filaments being coated with polystyrene.

14. In the process of injection molding, the step of forcing into a mold an injection molding compound comprising elongated granules having therein from about 15–60% by weight of the granule of glass filaments extending generally parallel to each other longitudinally of the granule, said filaments being coated with styrene-butadiene copolymer.

15. In the process of injection molding, the step of forcing into a mold an injection compound comprising elongated granules having therein from about 15–60% by weight of the granule of glass filaments extending generally parallel to each other longitudinally of the granule, said filaments being coated with a polyvinyl acetate sizing compound and a superjacent thermoplastic molding composition.

16. An injection molding compound comprising elongated granules of approximately one-sixteenth to one-eighth inch in diameter, each of said granules containing a bundle of elongated reinforcing filaments extending generally parallel to each other longitudinally of the granule and a thermoplastic molding composition surrounding and permeating said bundle.

17. In the process of injection molding, the step of forcing into a mold an injection molding compound comprising elongated granules of approximately one-sixteenth to one-eighth inch in diameter, each of said granules containing a bundle of substantially aligned glass fibers impregnated and surrounded by a thermoplastic molded composition.

References Cited in the file of this patent

UNITED STATES PATENTS

| | | |
|---|---|---|
| Re. 22,899 | Tucker | July 15, 1947 |
| 2,344,733 | Ripper | Mar. 21, 1944 |
| 2,354,110 | Ford | July 18, 1944 |
| 2,477,268 | Saffir | July 26, 1949 |
| 2,491,409 | Kropa | Dec. 13, 1949 |
| 2,530,983 | Minter | Nov. 21, 1950 |
| 2,556,885 | Ness | June 12, 1951 |
| 2,611,958 | Semmelman et al. | Sept. 30, 1952 |
| 2,639,759 | Simison | May 26, 1953 |
| 2,688,774 | Malinowski et al. | Sept. 14, 1954 |
| 2,698,558 | Hawley | Jan. 4, 1955 |
| 2,702,241 | Hawley et al. | Feb. 15, 1955 |

FOREIGN PATENTS

| | | |
|---|---|---|
| 122,072 | Australia | Aug. 20, 1946 |
| 585,167 | Great Britain | Jan. 31, 1947 |